United States Patent
Kimura

(10) Patent No.: US 6,824,276 B2
(45) Date of Patent: Nov. 30, 2004

(54) IMAGE PROCESSING WITH CHANGES OF OPTICAL SYSTEM OF PROJECTOR

(75) Inventor: Keishi Kimura, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/252,541

(22) Filed: Sep. 24, 2002

(65) Prior Publication Data

US 2003/0067589 A1 Apr. 10, 2003

(30) Foreign Application Priority Data

Oct. 4, 2001 (JP) ........................................ 2001-308929

(51) Int. Cl.$^7$ .............................................. G03B 21/14
(52) U.S. Cl. ........................ 353/84; 353/121; 353/122
(58) Field of Search ..................... 353/84, 31, 121, 353/122; 349/5, 7; 359/722, 723, 889

(56) References Cited

U.S. PATENT DOCUMENTS

| | | | | |
|---|---|---|---|---|
| 5,790,329 A | * | 8/1998 | Klaus et al. ................. | 359/887 |
| 5,805,243 A | * | 9/1998 | Hatano et al. ................. | 349/5 |
| 6,513,934 B1 | * | 2/2003 | Okuyama ..................... | 353/31 |
| 6,520,645 B2 | * | 2/2003 | Yamamoto et al. ........... | 353/31 |
| 2003/0048424 A1 | * | 3/2003 | Schaareman et al. ......... | 353/31 |
| 2003/0063263 A1 | * | 4/2003 | Stanton et al. ................ | 353/84 |

FOREIGN PATENT DOCUMENTS

| | | |
|---|---|---|
| JP | A-7-72450 | 3/1995 |
| JP | A-2000-347292 | 12/2000 |
| JP | A-2001-186539 | 7/2001 |

* cited by examiner

Primary Examiner—William C. Dowling
(74) Attorney, Agent, or Firm—Oliff & Berridge, PLC

(57) ABSTRACT

The present invention enhances picture quality of a projected image by a projector. A projector has a detachable optical filter that possesses a transmittance characteristic to weaken a green color element in the projection light. An image processing module performs the color adjustment processing by changing a look-up table stored in a memory module.

14 Claims, 9 Drawing Sheets

(PRIOR ART)

IMAGE PROCESSING WITH CHANGES OF OPTICAL SYSTEM OF PROJECTOR

BACKGROUND OF THE INVENTION

1. Field of Invention

This invention relates to an image processing technique depending on changes of an optical system of a projector.

2. Description of Related Art

Projectors can be broadly classified into two categories: data projectors and video projectors, depending on their intended use. Classifying projectors therefore requires definite performance.

Data projectors project an image based on image signals received from an information terminal, such as a personal computer. Data projectors are typically used for presentations in well-lighted places, such as conference rooms and lecture halls, where brightness is important for a projected image. On the other hand, video projectors project a screen image of TV or a movie based on screen image signals received from an AV device. Video projectors are typically used for watching a movie in dark places, such as less-illuminated rooms, where picture quality including color balance or contrast is more important than brightness.

Various types of discharge lamps, such as ultra-high pressure mercury lamps, metal halide lamps and xenon lamps are generally used to provide illumination for projectors in terms of keeping high color rendering properties and high luminance. FIG. 10 is a graph that shows an emission spectrum of an ultra-high pressure mercury lamp. Projectors divide illumination into three colors; red light (R), green light (G) and blue light (B), which are modulated by light valves respectively, thereby projecting an image. Illumination can be utilized when it is divided into, for example, blue light in 400–500 (nm) wavelength range, green light in 500–600 wavelength range and red light in 600–700 wavelength range.

Projectors can be generally used as data projectors. Illumination that includes green light with high visibility can be used to enhance brightness of the projected image, which loses color balance between R, G and B.

Color balance adjustment in a projector that is used as a video projector can be performed by setting the tone value of the image data with regard to green light to, for instance, 0.8 times stronger than that used for a data projector. Namely, color adjustment can be achieved by weakening the strength of green light due to the drive of a liquid crystal panel (hereafter "LCP"), as shown in a dashed line in FIG. 10.

However, projectors that use an LCP as a light valve have not sufficiently attained a high level contrast ratio for the projected image in terms of the above-mentioned color balance adjustment. The contrast ratio is represented in the ratio between the brightness of the all-white-image and all-black-image.

FIG. 11 is a chart that shows the relationship between an input tone value and the brightness in projecting a gray color image where input tone values of R, G and B are equivalent. A solid line L1 shows the relationship between the input tone value and the brightness without the above color balance adjustment, and a dashed line L2 shows this relationship with the color balance adjustment. The contrast ratio without the color balance adjustment is represented by B1/B0, and B2/B0 represents the contrast ratio with the color adjustment. As shown in FIG. 11, in the above-mentioned adjustment, the brightness for an all black image remains in B0, though the brightness for an all white image decreases from B1 to B2 due to the characteristic of an LCP that luminance barely passes light valves even when all light valves are closed to project all black image (refer to a chain double-dashed line in FIG. 10). The contrast ratio thus decreases in the above-mentioned adjustment.

SUMMARY OF THE INVENTION

Accordingly, it has been difficult to achieve both the preferable color balance adjustment and the preferable contrast ratio at the same time.

Furthermore, the color balance adjustment has not been efficient for a black or a low tone image. There is a slight difference in the brightness between a black image that is projected with the color balance adjustment and such a projected image without the adjustment. Utilizing a lot of green light illumination has caused black images to be projected in a greenish gray color.

The present invention thus provides a technique of enhancing picture quality of an image projected by a projector.

At least part of the above and the other related advantages are attained by a projector with the following construction. The first embodiment of the projector includes: an image processing module that performs image processing with regard to an input original image data; an image generating module that generates an image based on an image data that is provided with the image processing; a projection optical system that projects an image generated by the image generating module using illumination light that includes specific emission spectrum; and an optical filter that is detachable and weakens at least part of spectral intensity in a wavelength range among an emission spectrum included in the illumination light, which affects the projection of the image. The image processing module performs the specific image processing in response to the changes of the spectral intensity caused by putting on/taking off the optical filter.

As described above, the color balance adjustment for a projected image is performed through the process of image processing in a projector that uses an LCP as a light valve, which causes low contrast ratio. The projector of the present invention has a detachable optical filter in order to weaken at least part of the spectral intensity. Using such an optical filter enables color balance adjustment for the projected image, and reduces or prevents low contrast ratio because that reduces the brightness for black color in the projected image as well as other colors. The optical filter can be removed from a projection optical system when brightness is more important than color balance.

In the projector of the present invention, because spectral intensity in projection light, which affects projection of the image, is different when the optical filter is attached compared to when it is not attached, the color balance of the projected image is different when the optical filter is attached compared to when it is not attached. The image processing module in the projector enables the adequate image processing, with regard to the original image data in response to the changes of spectral intensity in projection light, depending on the optical filter status, whether attached or not, thereby achieving both preferable color balance and preferable contrast ratio at the same time and enhancing picture quality of the projected image.

In the first embodiment of the present invention, the image processing may be any of diverse image processing techniques. It is, however, preferable that the specific image processing is color adjustment.

This procedure desirably enhances color reproducibility in the projected image.

In the first embodiment of the projector, it is preferable that the wavelength range affecting projection of the image responds to red light, green light and blue light, and that the optical filter has the highest reducing rate of spectral intensity in the wavelength range corresponding to green light.

Hereinafter, 'reducing rate of spectral intensity in wavelength range corresponding to green light is the highest' indicates that reducing rate of spectrum strength in wavelength range corresponding to green light is the highest among the projected light emitted from the projection optical system, which is not caused by characteristics of the optical filter.

In general, illumination light from a projector that uses an LCP as a light valve becomes greenish. Reducing spectral intensity with regard to green light enables effective color balance adjustment with high contrast ratio, and reduces or prevents the projected images in black or low scale from being greenish.

In the first embodiment of the present invention, the image processing module includes: a memory module that stores parameters used for the image processing in relation to the optical filter; a specific information input module that inputs specific information to identify the optical filter; and an image processing controller in order to select the parameters based on the specific information.

'Parameters used for image processing' include a look-up table and a function showing the relationship between input tone values of the image data and output tone values for the image generating module. Such parameters used for the image processing are not restricted to parameters for the color adjustment. As 'specific information', for example, the model numbers of the optical filters may be available. In the projector, the optical filter is selected with specific information, which enables adequate image processing.

In the projector, specific information may be manually input. It is, however, preferable that the image processing controller select the parameters based on specific information obtained from the specific information module of the optical filter, which stores the specific information.

The specific information input module thus automatically obtains the specific information, and the image processing controller selects the parameters based on the obtained information, which enhances the convenience of the projector. An IC chip and an electrode arranged uniquely in each optical filter can be used as the 'specific information module'.

In the first embodiment of the projector, the optical filter may be detachable to some portions in the projection optical system, for example, inside of the projector, according to its characteristic. It is, however, preferable that the optical projection system have a projection lens, and the optical filter can be attached to exterior of the projection lens.

The inside structure of the projector may thus be simplified, and the optical filter may be put on or taken off by the user easily.

In general, the above-mentioned image processing is available in terms of the specific image processing in response to the changes of optical characteristics in the projection optical system. Such process is applicable for the projector that is capable of putting on and taking off various projection lenses, such as a super-wide-angle lens and a telescopic lens, and other optical components.

In the second embodiment of the projector, a projector that projects an image includes: an image processing module that performs an image processing with regard to an input original image data; an image generating module that generates an image based on an image data that is provided with the image processing; a projection optical system that projects an image generated in the image generating module; and an optical component that is detachable from the image generating module, which enables the change of optical characteristics of the projection optical system. The image processing module performs the specific image processing in response to the change of optical characteristics caused by putting on/taking off the optical component.

This application enables adequate image processing for the original image data in response to the changes of optical characteristics in the projection optical system.

In the second embodiment of the projector, the image processing may be any of diverse image processing techniques. It is, however, preferable that the specific image processing be sharpness adjustment.

The optical components changing the range of the projection may be a projection lens, such as a super-wide-angle lens. Changing the projection lens may be performed based on changing the distance between the projector and the screen, which affects the degree of preferable sharpness adjustment when the projected range or the focused distance is changed. The projector enables adequate sharpness adjustment in response to the changes of optical characteristics in the projection optical system when changing an optical component, such as the projection lens.

In the second embodiment of the projector, the image processing module includes: a memory module that stores parameters used for the image processing depending on the type of the optical component; a specific information input module that inputs specific information to identify the optical component; and an image processing controller in order to select the parameters depending on the specific information.

This application enables the identification of the optical component based on the specific information, thus performing efficient image processing. The parameters used for the sharpness adjustment and other image processing can be used as the 'parameters used for the image processing'.

In the projector, specific information may be manually input. It is, however, preferable that the image processing controller select parameters based on specific information obtained from a specific information module of the optical component, which stores the specific information.

The specific information input module thus automatically obtains the specific information, and the image processing controller selects the parameters based on the obtained information, which enhances the convenience of the projector.

The application of the present invention is not restricted to the projector. There are, however, a diversity of other applications of the present invention, such as an image processing method, a computer program providing such a method, a recording medium in which such a computer program is recorded, and a data signal including such a computer program and being embodied in a carrier wave, for example. The various additions and modifications described above are applicable to any of these embodiments.

When the technique of the present invention is embodied by any of the computer program or the recording medium in which such a computer program is recorded, the computer program may be the whole program for driving the image processing apparatus or the projector or only the partial program for attaining the characterized functions of the present invention. Typical examples of the recording medium include: flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media, for example.

DETAILED DESCRIPTION OF PREFERRED EMBODIMENTS

Figure 1:
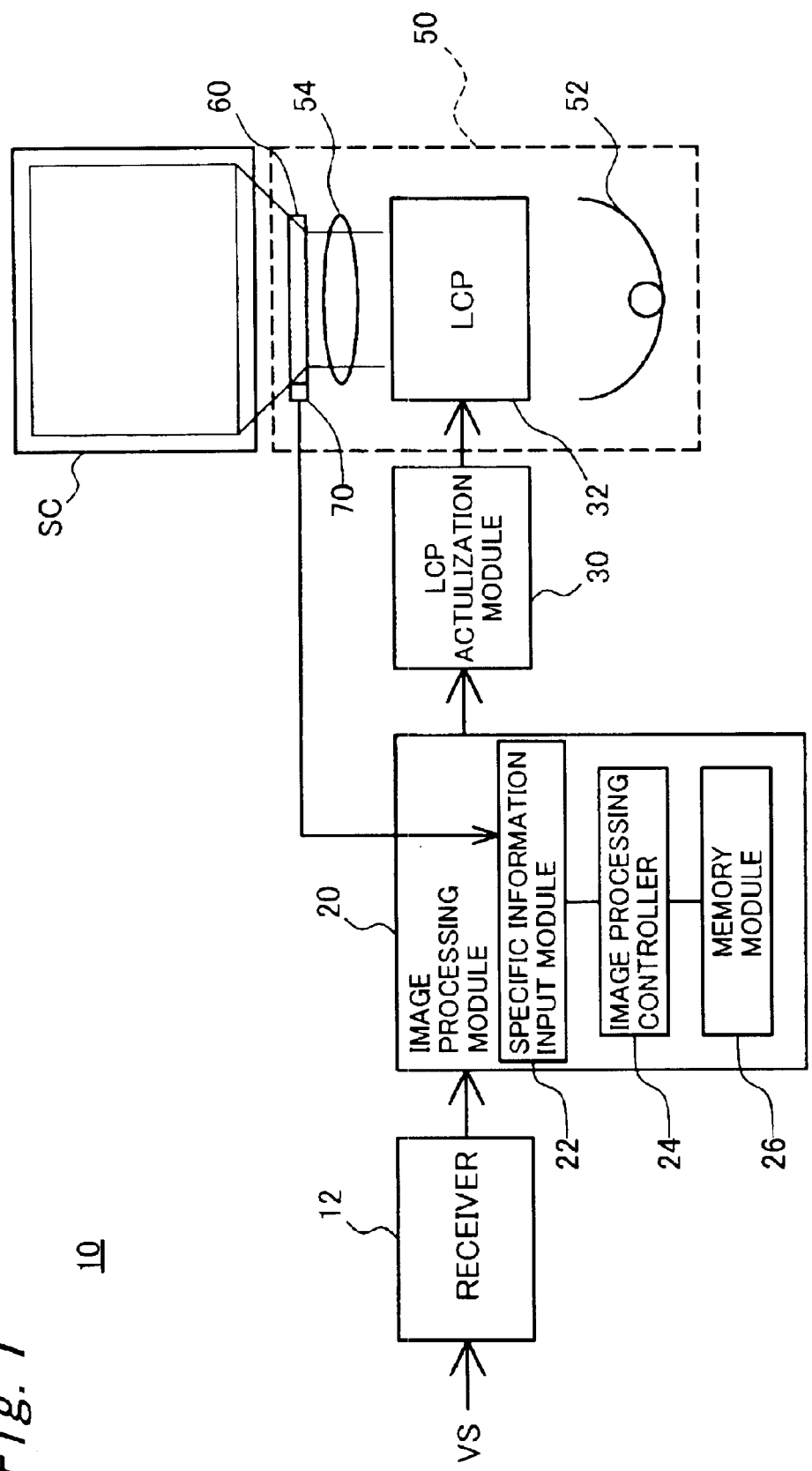
FIG. 1 is a schematic that shows the general construction of a projector 10 in the first embodiment of the present invention.

One mode of performing the present invention is discussed below as a preferred embodiment in the following sequence:

A. General Construction of Projector
B. Optical Filter
C. Image Processing
D. Second Embodiment
E. Modifications A. General Construction of Projector FIG. 1 is a schematic that shows the general construction of a projector 10 in one embodiment of the present invention. The projector 10 includes a receiver 12, an image processing module 20, an LCP actuation module 30 and a LCP 32. The projector 10 is further provided with a projection optical system 50, which includes an illumination device 52 that illuminates the LCP 32, a projection lens 54 projecting transmitted light through the LCP 32 onto the screen SC, and other optical systems that are described later. An optical filter 60, which is explained in detail later, is detachable from the projection lens 54 when a user views an image projected by the projector 10, and has a specific information module 70 storing specific information to identify the type of the optical filter.

The receiver 12 inputs an analog and a digital image signal supplied from an information terminal, such as a personal computer, or a screen image signal VS from an AV device, which are converted into a processible image data form in the image processing 20.

The image processing module 20 includes a specific information input module 22, a image processing controller 24 and a memory module 26. The specific information input module 22 automatically obtains specific information from the specific information module 70 when the optical filter 60 is attached to the projection lens 54. In this embodiment, the specific information module 70 of the optical filter 60 includes the electrode. The specific information input module 22 can automatically detect the optical filter 60 status, whether attached or not, depending on this electrode conditions, whether connected to the circuit or not. The specific information, whether the optical filter is attached or not, may manually be input into by the user with a switch installed to store data. The user may also store data of the optical filter 60 using a remote controller.

The memory module 26 stores look-up tables corresponding to the status whether the optical filter 60 is attached or not. This one-dimensional look-up table stores the relationship between the input tone value of the image data and the output tone value to the LCP actualization module 30 for each color of R, G and B distinctly, which is used for the color adjustment. The image processing controller 24 selects the look-up table based on the specific information and the type of image signal, whether the image signal input into the receiver 12 is transmitted from an information terminal or an AV device. The selection will be described later in detail. The image processing controller 20 can also adjust the picture quality for image data with regard to the luminance, the contrast and the sharpness as well as the color adjustment, and enables various image processing, such as a keystone correction where 'elevated projection' is performed by the projector 10.

The LCP actuation module 30 generates a driving signal to actuate the LCP 32 based on the image data generated in the image processing module 20.

The LCP 32, which is a transmissive LCP, modulates illumination light in response to the driving signal, as a light valve, or a light modulator.

Figure 2:
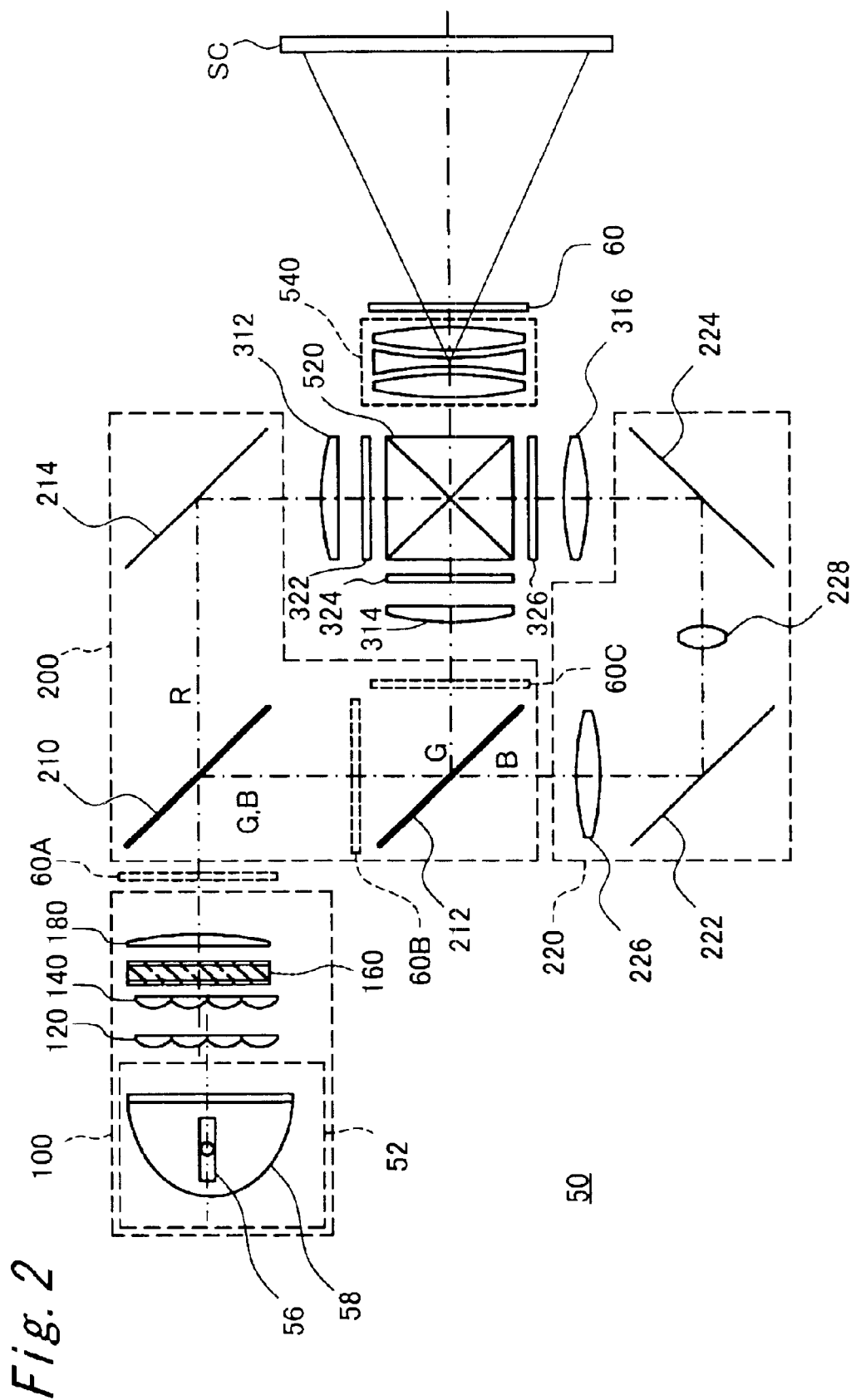
FIG. 2 is a schematic that shows the structure of a projection optical system 50 of the projector 10.

FIG. 2 is a schematic that shows the structure of a projection optical system 50 of the projector 10. The projection optical system 50 includes an illumination optical system 100, a color light separation optical system 200, a relay optical system 220, three field lenses 312, 314 and 316, three liquid crystal light valves 322, 324 and 326, a cross dichroic prism 520, a projection lens system 540 and the optical filter 60.

The illumination optical system 100 includes an illumination device 52 equipped with an ultra-high pressure mercury lamp 56 and a parabolic mirror 58, lens arrays 120 and 140, a polarizing change element 160 and an overlay lens 180.

The color light separation optical system 200 includes dichroic mirrors 210 and 212, and a reflecting mirror 214. The dichroic mirror 210 passes red light (R) while reflecting green light (G) and blue light (B). The next dichroic mirror 212 passes blue light (B) while reflecting green light (G).

The relay optical system 220 includes an incident lens 226, reflecting mirrors 222 and 224, and a relay lens 228.

Illumination light emitted from the illumination optical system 100 is divided into three colors of red light (R), green light (G) and blue light (B) in the color light separation optical system 200. The divided color lights are modulated by the liquid crystal light valves 322, 324 and 326, respectively, in response to image data, which are integrated by the cross dichroic prism 520 and thereby displayed onto the screen SC through the projection lens system 540, so that the color image is displayed onto the screen SC.

B. Optical Filter

Figure 3A:
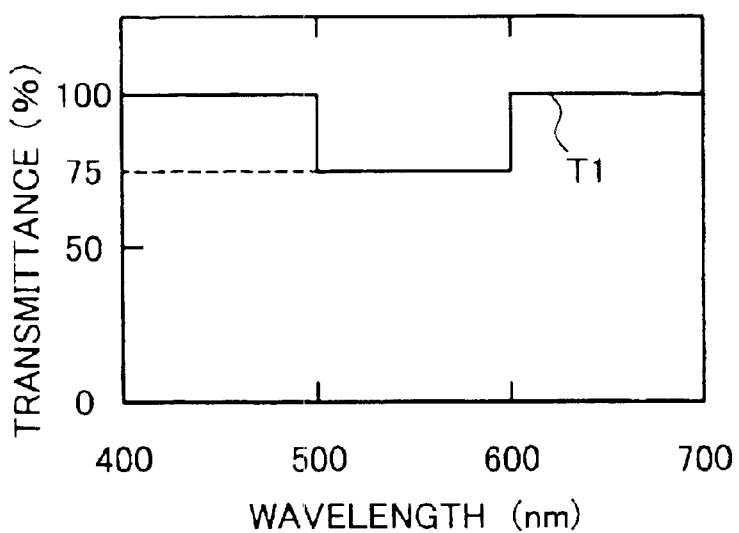
FIGS. 3A–3C are charts that show transmittance characteristic of an optical filter.
Figure 3B:
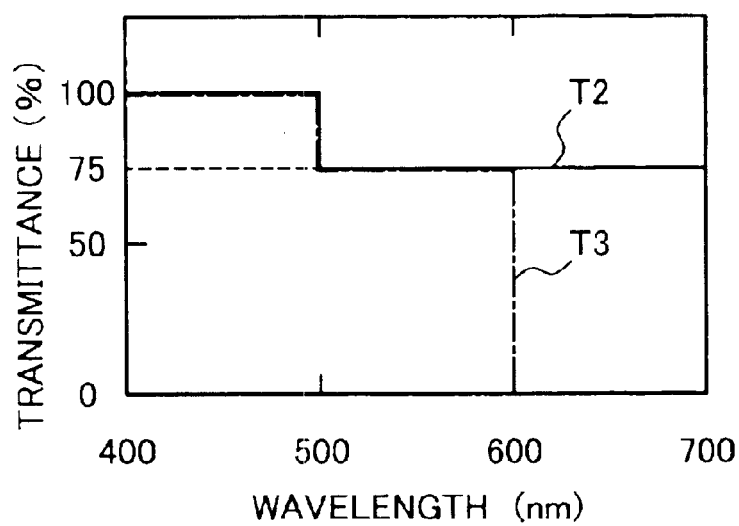
Figure 3C:
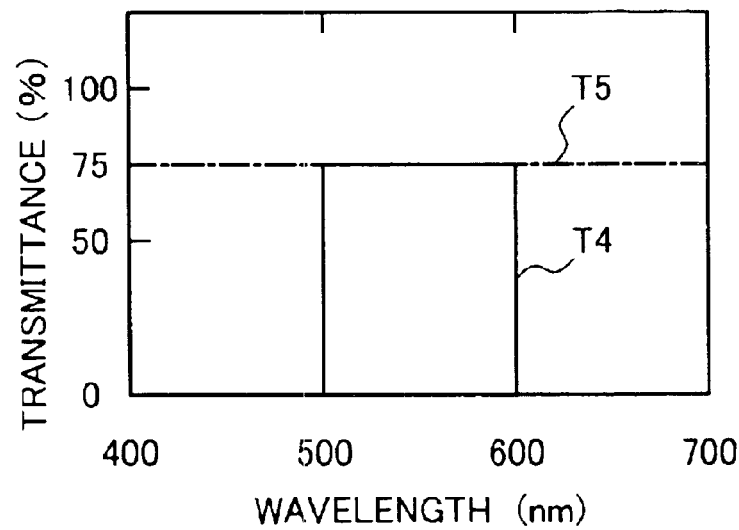

The optical filter 60 can weaken the strength of green light among projected light on the screen SC. FIGS. 3A–3C are charts that show the transmittance characteristic of an optical filter. As shown in FIG. 3A, the optical filter 60 has a transmittance characteristic of passing blue light and red light almost 100%, while passing about 75% of green light.

In the embodiment, the optical filter is provided to weaken the strength of green light among the projected light on the screen SC, which may be installed at any position inside of the projection optical system 50 without restriction. The optical filter 60 may be installed, for example, between the illumination optical system 100 and the color light separation optical system 200, instead of attaching it to the projection lens 54 (60A in FIG. 2).

On the other hand, another type of optical filter with transmittance characteristic shown in FIG. 3B can be installed between two dichroic mirrors 210 and 212. Because a red color element is not included in the color light reflected by the dichroic mirror 210, the optical filter, which passes almost 100% of blue light and about 75% of green light, as shown in a solid line T2 and a dashed line T3 in FIG. 3B, may obtain projection light similar to the case of using the optical filter 60 of FIG. 3A.

Furthermore, a further alternative optical filter with transmittance characteristic shown in FIG. 3C can be installed between the dichroic mirror 212 and the field lens 314. Because neither a red color element nor a blue color element are included in the color light reflected by the dichroic mirror 212, the optical filter, which passes about 75% of green light, as shown in a solid line T4 and a dashed line T5, may obtain projection light similar to the case of using the optical filter 60 of FIG. 3A. The optical filter with transmittance characteristic shown in FIG. 3A may be used as any one of the above-mentioned optical filters. It is, however, preferable that the optical filter 60 be attached to outside of the projection lens 54, thus desirably enabling a simplified internal structure of the projector 10, so that the user may put on/take off the optical filter 60 easily.

Figure 10:
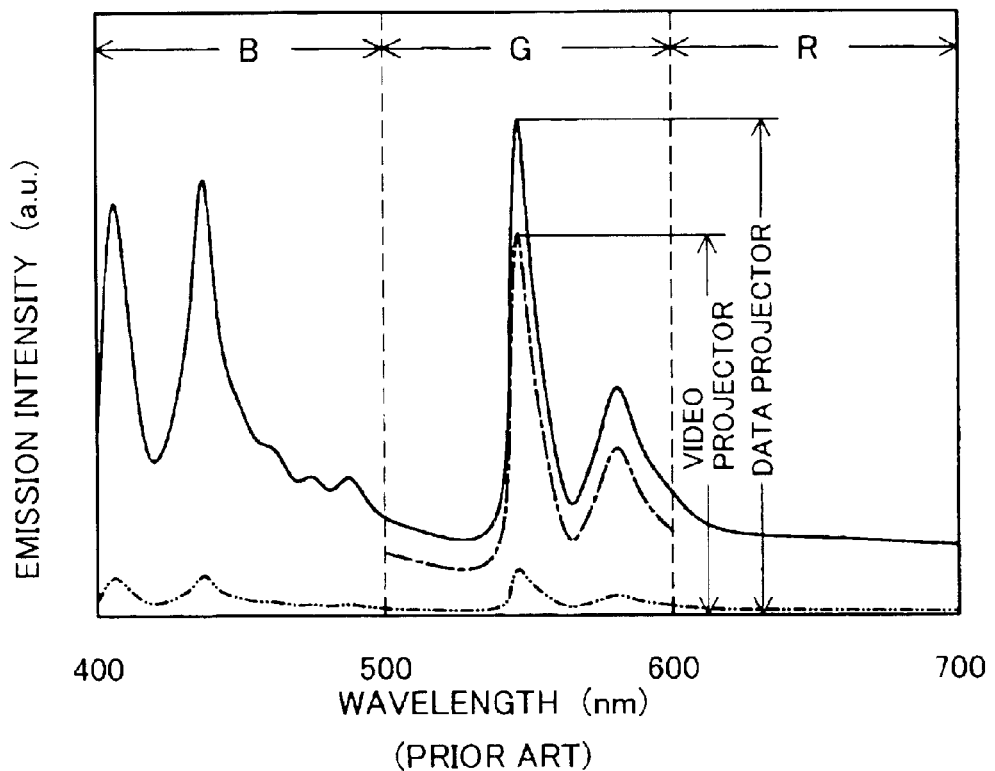
FIG. 10 is a graph that shows the emission spectrum of a ultra-high pressure mercury lamp.

In the embodiment, the ultra-high pressure mercury lamp 56 includes the emission spectrum shown in FIG. 10. The inventor discovered that the color balance between R, G and B can be adjusted proficiently with certain luminance kept for the projected image by setting transmittance of green light 25% lower than those of red light and blue light, and thereby setting the transmittance of green light to about 75% with regard to the optical filter 60. Accordingly, transmittance in each wavelength range may be set optionally corresponding to the type of the illuminant lamp and characteristics of the optical systems.

Figure 4:
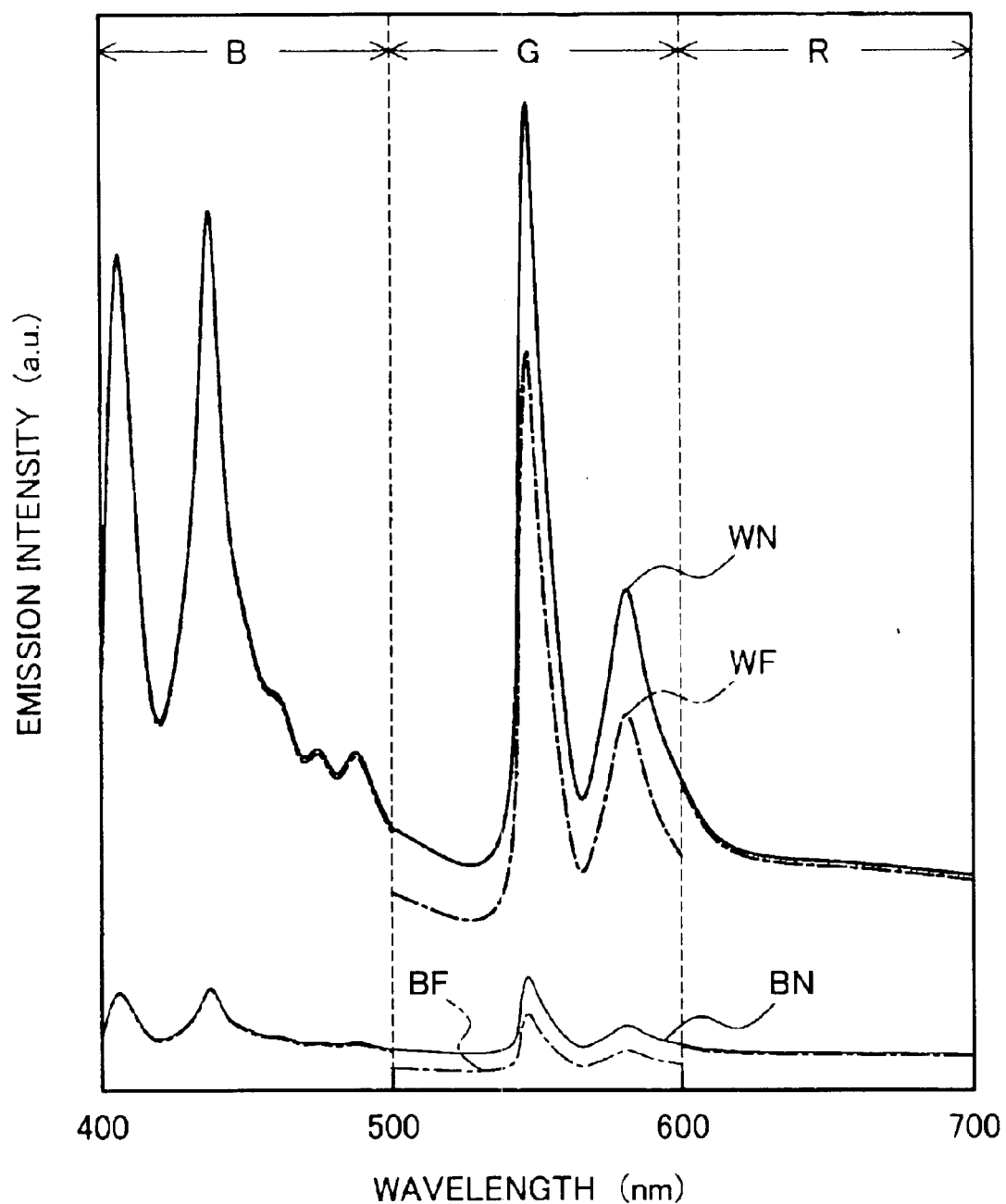
FIG. 4 is a graph that shows spectrum of projection light when projecting images in all white or all black by the projector 10.

FIG. 4 shows spectrum of projection light when projecting an all-white-image or an all-black-image with the projector 10. A solid line WN shows the spectrum of the projection light of the all-white-image without the optical filter 60, while a dashed line WF shows the spectrum with the optical filter 60 attached. A solid line BN shows the spectrum of projection light of the all-black-image without the optical filter 60, while a dashed line BF shows the spectrum with the optical filter 60 attached. As illustrated, the optical filter 60 weakens spectral intensity of green light of the all-white-image or the all-black-image up to about 75% of that without the optical filter 60, which makes the all-black-image darker than the case without the optical filter 60. This application may address or solve some related art problems. One example is the all-black-image projected in greenish black color.

C. Image Processing

As explained, the projector 10 performs color adjustment processing with the selection of the look-up table according to the received image signal and the optical filter 60 status, whether attached or not.

Figure 5:
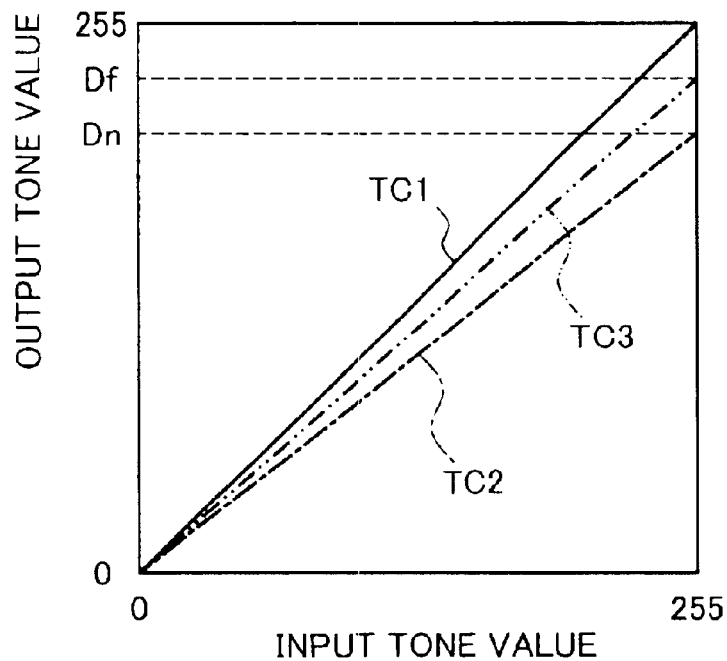
FIG. 5 is a chart that shows one example of tone curves recorded in each look-up table.
Figure 11:
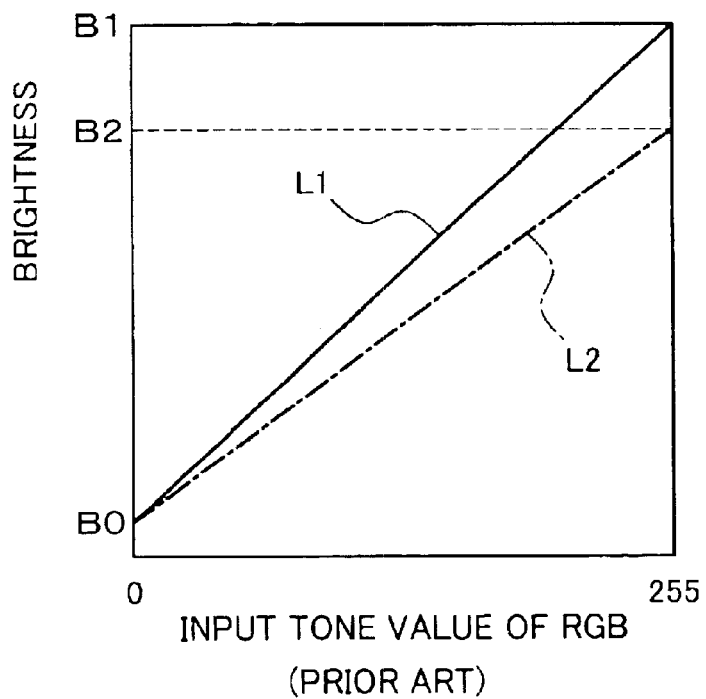
FIG. 11 is a chart that shows the relationship between input tone value and brightness where an image in gray tone is projected with equal input tone value of R, G and B.

FIG. 5 shows one example of tone curves recorded in each look-up table. Although only tone curves for green are specifically illustrated, there are some other tone curves with regard to red and blue as well. A solid line TC1 represents a tone curve where the receiver 12 receives the image signal from information terminals without the optical filter 60, which emphasizes the brightness of the projected image. A dashed line TC2 represents a tone curve where the receiver 12 receives the image signal from AV devices without the optical filter 60, which is accompanied by low contrast ratio shown in FIG. 11. A chain double-dashed line TC3 represents a tone curve where the optical filter 60 is attached regardless of the type of the image received by the receiver 12, which emphasizes color balance. In the tone curve TC2, the output tone value is Dn at the input tone value of 255, on the other hand, in the tone curve TC3, the output tone value becomes Df, which is larger than Dn. This enables the brightness of the all-white-image between the tone curves TC2 and TC3 to be equal. These tone curves TC1, TC2 and TC3 are recorded into look-up tables LUT1, LUT2 and LUT3 respectively. The tone curves are optionally settable, and are not restricted to the tone curves illustrated herein. In the figures, for example, all of the tone curves are linear, while nonlinear patterns may be applicable. Using those look-up tables desirably enhances color reproducibility in the projected image.

Figure 6:
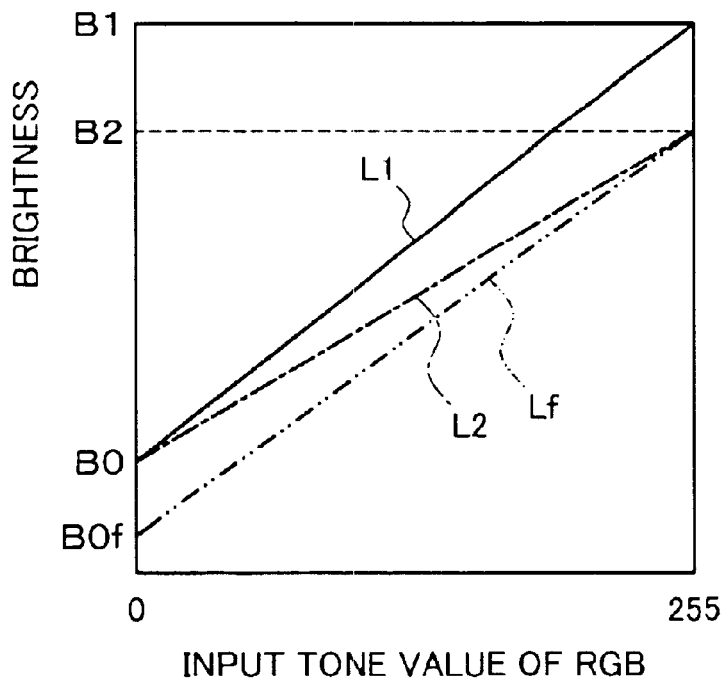
FIG. 6 is a chart that shows the relationship between input tone value and brightness where an image in gray tone is projected with equal input tone value of R, G and B.

FIG. 6 shows the relationship between the input tone value and brightness, where an image in gray tone is projected with equal input tone value of R, G and B. A solid line L1 represents the relationship where the tone curve TC1 is applied without the optical filter 60. Here, the brightness of the all-white-image is B1 and the brightness of all-black-image is B0, accordingly, the contrast ratio becomes B1/B0. A dashed line L2 represents the relationship where the tone curve TC2 is applied without the optical filter 60. Here, the brightness of the all-white-image is B2 and that of all-black-image is B0, accordingly, the contrast ratio becomes B2/B0. A chain double-dashed line Lf represents the relationship where the tone curve TC3 is applied with the optical filter 60 attached. Here, the brightness of the all-white-image is B2 and the brightness of all-black-image is B0f, accordingly, the contrast ratio becomes B2/B0f. As illustrated, B0f is smaller than B0, and B2/B0f is bigger than B2/B0. The optical filter 60 and the tone curve TC3 can keep the preferable contrast ratio, while emphasizing the color balance.

Figure 7:
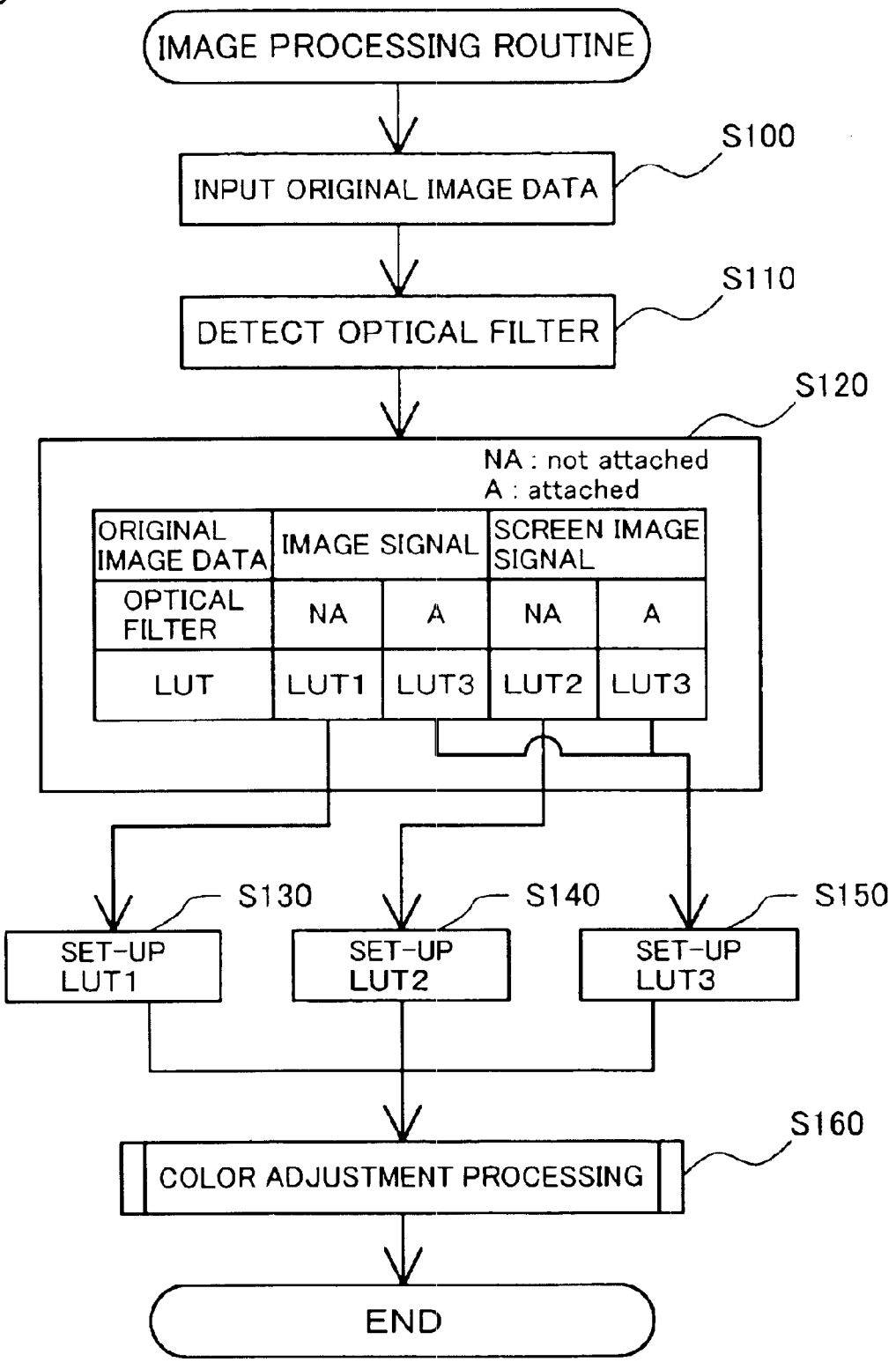
FIG. 7 is a flowchart showing an image processing routine of the first embodiment.

FIG. 7 is a flowchart showing an image processing routine of the first embodiment executed in the image processing module 20. First, an original image data is input (Step S100). Then, the status of the optical filter 60, whether attached or not, is detected (Step 110). Then, selecting the look-up table depending on the type of the original data, whether original data is the image signal received from information terminals, or the screen image signal received from AV devices as well as the optical filter 60 status, whether attached or not (Step S120), so that either of look-up tables LUT1, LUT2 or LUT3 is set up (Step S130, S140 or S150). The color adjustment processing is performed with the selected look-up table (Step S160). Finally, the image processing routine is ended.

In the projector 10 of the first embodiment, using the optical filter 60 can reduce the deterioration of the contrast ratio when viewing the projected image depending on the screen image signal received from AV devices. In addition, color reproducibility in the projected image may be enhanced by providing adequate color adjustment with respect to image data depending on the optical filter 60 status, whether attached or not.

D. Second Embodiment

In the projector 10 of the first embodiment, color adjustment is performed with the selection of the look-up table depending on the type of input image data as well as the optical filter 60 status. In the second embodiment, the image processing is performed with the selection of the parameters corresponding to the type of projection lenses that are exchangeable.

Figure 8:
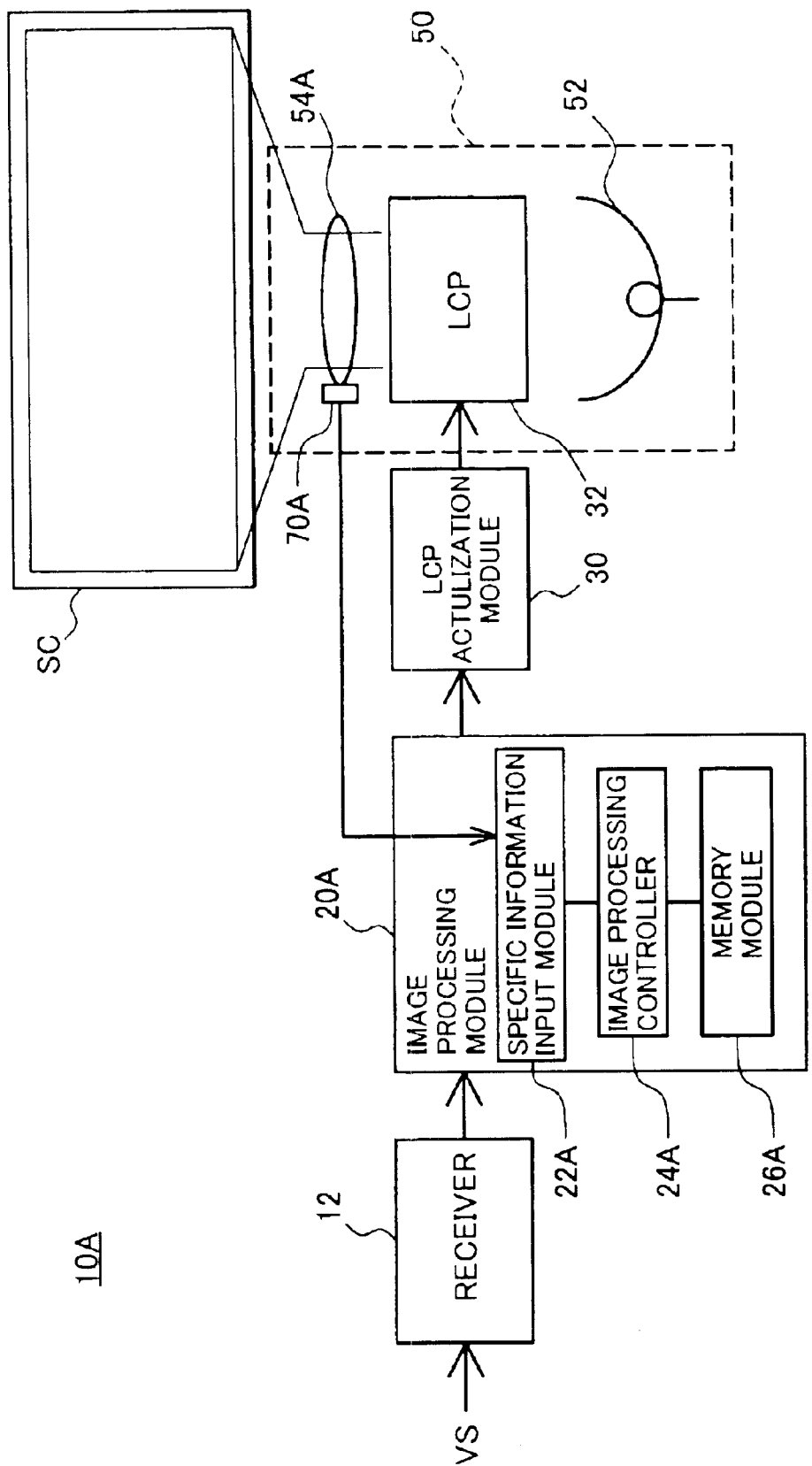
FIG. 8 is a schematic that shows the general construction of a projector 10A in the second embodiment of the present invention.

FIG. 8 shows the general construction of a projector 10A in the second embodiment of the present invention. As is the case with the projector 10 of the first embodiment, the projector 10A includes a receiver 12, an image processing module 20A, an LCP actualization module 30, an LCP 32 and a projection optical system 50A equipped with a super-wide-angle lens 54A as a projection lens. Corresponding to the set-up conditions of the projector 10A, the super-wide-angle lens may be changed with a normal projection lens or a telescopic lens, which are not specifically illustrated. Those exchangeable projection lenses have a specific information module 70A to identify their optical characteristics, such as focal distance.

The image processing module 20A includes a specific information input module 22A, an image processing controller 24A and a memory module 26A. The specific information input module 22A automatically obtains specific information from the specific information module 70A when the projection lens, such as the super-wide-angle lens 54A, is attached. It is also preferable to install the switch so as to manually input the specific information relating to the projection lenses by the user.

The memory module 26A, which is used for the image processing, stores various parameters to adjust the picture quality, such as the sharpness adjustment, the brightness adjustment and the contrast adjustment, which are selected depending on the type of projection lenses. The projection lens is changed in response to the change of the projection distance between the projector 10A and the screen SC, which affects the degree of preferable sharpness adjustment caused by the change of the focused distance. In the example of using the ultra-wide-angle lens 54A, the projected image may be fuzzier than the case of using the normal projection lens. In the embodiment, accordingly, the memory module 26A stores parameter sets relating to the sharpness adjustment distinctively by the specific information, that is, the type of the projection lenses; a parameter set1 for the normal projection lens, a parameter set2 for the ultra-wide-angle lens 54A and a parameter set3 for a telescopic lens. The parameter set2 for the ultra-wide-angle lens 54A, for example, has the parameter to provide the sharpness adjustment that is stronger than the parameter set1. The image processing controller 24A selects one of the parameter sets depending on the specific information.

Figure 9:
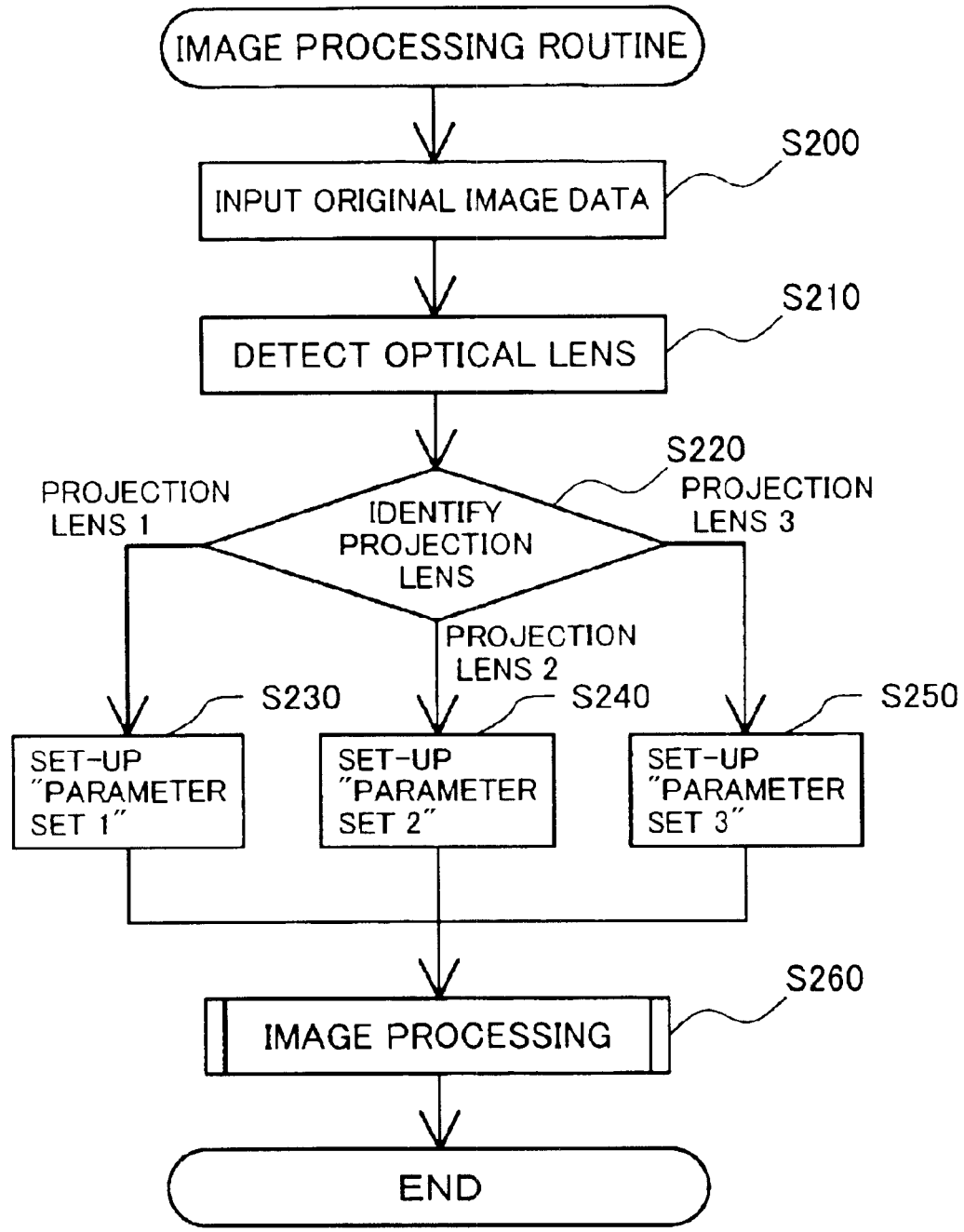
FIG. 9 is a flowchart showing an image processing routine of the second embodiment.

FIG. 9 is a flowchart showing the image processing routine of the second embodiment executed in the image processing module 20A. First, an original image data is input (Step S200). Then obtaining specific information so as to detect the projection lens (Step 210), and thereby specifies the type of the projection lens (Step S220). In Step 220, the parameter set1 is selected if the projection lens is the normal one (Step 230). In case of the ultra-wide-angle lens 54A, the parameter set2 is selected (Step S240). In case of the telescopic lens, the parameter set3 is selected (Step S250). The specific image processing is performed with the selected parameter set (Step 260) and finally, the image processing routine is ended.

In the projector 10A of the second embodiment, the parameter used for the image processing depending on the optical characteristic is exchangeable when changing the projection lens in order to provide image data with adequate image processing, so that the picture quality of the projected image may be enhanced.

E. Modifications

The described embodiments are to be considered in all aspects as illustrative and not restrictive. There may be many modifications, changes, and alterations without departing from the scope or spirit of the main characteristics of the present invention. Some examples of possible modification are given below.

E1. Modified Example 1

In the first embodiment, the look-up table is selected based on the optical filter 60 status, whether attached or not. It is also preferable that the look-up table be selected depending on more various conditions. The look-up table, for example, may be selected depending on various types of optical filters with different transmittance characteristics respectively. In this case, each optical filter desirably has the specific information module in order to have an individual characteristic identified where the IC chip and the electric poles arranged uniquely in the optical filters respectively are available.

The invention is not limited to the selection of the look-up table, and selecting a parameter used for other image processing is also a preferable procedure in accordance with the invention.

In the above embodiment, look-up tables are provided for the colors of R, G and B, respectively. It is, however, preferable that providing look-up tables only for green color (G) in which spectral intensity is reduced in the projection light.

E2. Modified Example 2

The image processing is not restricted to the procedure of the above embodiment that selects the parameters prepared beforehand in the memory module depending on specific information obtained from the specific information module. For example, the specific information module may be equipped with the memory to store the parameters, which are used for the image processing, so that the image processing module may perform the image processing with the parameters that are read out from this memory.

E3. Modified Example 3

The image processing is not restricted to the procedure of the above second embodiment that selects the parameter used for the sharpness adjustment in response to the change of the projection lens. Another procedure depending on the status of other optical components (lenses except for the projection lens, prisms and filters); whether attached or not, is applicable so as to enhance the picture quality of the projected image, since the image processing of the present invention is generally performed based on the status of the optical components that changes optical characteristics in the projection optical system.

E4. Modified Example 4

The above second embodiment is described regarding the construction of the projector utilizing the transmission-type LCP. The technique of the present invention is also applicable to other types of projectors, such as those utilizing a reflection-type LCP, and those utilizing a Digital Micro Mirror Device (TM), for example.

What is claimed is:

1. A projector that projects an image, comprising:

an image processing module that performs image processing with regard to input original image data;

an image generating module that generates an image based on an image data that is provided with the image processing;

a projection optical system that projects the image generated by the image generating module using illumination light that includes a specific emission spectrum; and an optical filter that is detachable and weakens at least partial spectral intensity in a wavelength range among the emission spectrum included in the illumination light, which affects the projection of the image, the image processing module performing the specific image processing by selecting predetermined parameters based on a type of the input original image data and changes of the spectral intensity caused by attaching/detaching the optical filter.

2. The projector in accordance with claim 1, the image processing being color adjustment.

3. The projector in accordance with claim 1, the wavelength range that affects projection of the image corresponding to red light, green light and blue light, and the optical filter having a highest reducing rate of spectrum strength in a wavelength range corresponding to green light among wavelength ranges corresponding to three colors of red light, green light and blue light.

4. The projector in accordance with claim 1, the image processing module including:

a memory module that stores parameters used for the image processing depending on the optical filter;

a specific information input module that inputs specific information to identify the optical filter; and an image processing controller that selects the parameters depending on the specific information.

5. The projector in accordance with claim 4, the optical filter including:

a specific information module that stores the specific information, the image processing controller selecting the parameters depending on the specific information obtained from the specific information module.

6. The projector in accordance with claim 1, the projection optical system being equipped with a projection lens, and the optical filter being detachable to an exterior of the projection lens.

7. A projector that projects an image, comprising:

an image processing module that performs image processing with regard to input original image data;

an image generating module that generates an image based on an image data that is provided with the image processing;

a projection optical system that projects the image generated by the image generating module; and an optical component that is detachable from the projection optical system, which enables optical characteristics of the projection optical system to be changed, the image processing module performing a specific image processing by selecting predetermined parameters based on a type of the optical component and changes of the optical characteristics caused by attaching/detaching the optical component.

8. The projector in accordance with claim 7, the optical component changing the range of projection of the projection optical system, and the image processing being sharpness adjustment.

9. The projector in accordance with claim 7, the image processing module including:

a memory module that stores parameters used for the image processing depending on the optical component;

a specific information input module that inputs specific information to identify the optical component; and an image processing controller that selects the parameters depending on the specific information.

10. The projector in accordance with claim 9, the optical component including:

a specific information module that stores the specific information, the image processing controller changing the parameter depending on the specific information obtained from the specific information module.

11. An image processing method that performs image processing with regard to image data projected by a projector that projects an image using illumination light, the illumination light including a predetermined emission spectrum, the image processing method comprising:

inputting original image data to be projected;

detecting whether an optical filter, which weakens at least partial spectral intensity in wavelength range affecting the image projection among emission spectrums that are included in the illumination light, is attached to the projector; and performing image processing by selecting predetermined parameters based on a type of the input original image data and changes of the spectral intensity caused by attaching/detaching the optical filter.

12. An image processing method that performs image processing with regard to image data projected by a projector that projects an image, which has an optical component with predetermined optical characteristics, the image processing method comprising:

inputting original image data to be projected;

detecting whether an optical component, which enables the change of optical characteristics of the projection optical system, is attached to the projector; and performing image processing by selecting predetermined parameters based on a type of the optical component and changes of the optical characteristics caused by attaching/detaching the optical component.

13. A recording medium in which a computer program is recorded in a computer readable manner, the computer program performing image processing with regard to image data projected by a projector using illumination light with predetermined emission spectrums, the computer program causing a computer to cause the following steps to be performed:

obtaining an input original image data to be projected;

detecting whether an optical filter, which weakens at least partial spectral intensity in a wavelength range affecting the image projection among emission spectrums included in the illumination light, is attached to the projector; and performing specific image processing by selecting predetermined parameters based on a type of the input original image data and changes of the spectral intensity caused by attaching/detaching the optical filter.

14. A recording medium in which a computer program is recorded in a computer readable manner, the computer program performing image processing with regard to image data projected by a projector, which has a projection optical system with predetermined optical characteristics, the computer program causing a computer to cause the following steps to be performed:

obtaining original image data to be projected;

detecting whether an optical component, which enables the change of an optical characteristic of the projection optical system, is attached to the projector; and performing image processing by selecting predetermined parameters based on a type of the optical component and changes of the optical characteristics caused by attaching/detaching the optical component.

* * * * *

UNITED STATES PATENT AND TRADEMARK OFFICE
CERTIFICATE OF CORRECTION

PATENT NO. : 6,824,276 B2
DATED : November 30, 2004
INVENTOR(S) : Keishi Kimura

It is certified that error appears in the above-identified patent and that said Letters Patent is hereby corrected as shown below:

Title page,
Item [75], Inventors, change "Keishi Kimura, Tokyo (JP)" to -- Keishi Kimura, Matsumoto (JP) --

Signed and Sealed this

Twenty-sixth Day of April, 2005

JON W. DUDAS
*Director of the United States Patent and Trademark Office*